(12) United States Patent
Buldas et al.

(10) Patent No.: US 8,874,921 B2
(45) Date of Patent: Oct. 28, 2014

(54) SYSTEM AND METHOD FOR GENERATING KEYLESS DIGITAL MULTI-SIGNATURES

(75) Inventors: Ahto Buldas, Tallinn (EE); Andres Kroonmaa, Saue (EE); Märt Saarepera, Tallinn (EE)

(73) Assignee: Guardtime IP Holdings, Ltd., Tortola (VG)

( * ) Notice: Subject to any disclaimer, the term of this patent is extended or adjusted under 35 U.S.C. 154(b) by 89 days.

(21) Appl. No.: 13/164,759

(22) Filed: Jun. 20, 2011

(65) Prior Publication Data

US 2012/0324229 A1 Dec. 20, 2012

(51) Int. Cl.
*H04L 9/32* (2006.01)
*H04L 9/00* (2006.01)

(52) U.S. Cl.
CPC ............ *H04L 9/321* (2013.01); *H04L 2209/38* (2013.01); *H04L 9/007* (2013.01); *H04L 9/3247* (2013.01)
USPC .......................................... 713/176; 713/177

(58) Field of Classification Search
USPC ................................. 713/176, 177
See application file for complete search history.

(56) References Cited

U.S. PATENT DOCUMENTS

2002/0184504 A1* 12/2002 Hughes .................. 713/177

OTHER PUBLICATIONS

Dan Boneh et al., "A Survey of Two Signature Aggregation Techniques," 2003.*

* cited by examiner

*Primary Examiner* — Andrew Georgandellis
(74) *Attorney, Agent, or Firm* — James P. Muraff; Neal, Gerber & Eisenberg LLP; Jeffrey Pearce (57) ABSTRACT

A method of generating a keyless digital multi-signature is provided. The method includes receiving multiple signature generation requests from one or more client computers, building subtrees based on the signature generation requests, and constructing a search tree including the subtrees. The method also includes assigning explicit length tags to leaf nodes of the search tree to balance the search tree and applying a hash function to each of the search tree nodes. The root hash value and the height of the search tree make up a generated aggregate signature request, followed by receiving an aggregate signature based on the aggregate signature request. The keyless digital multi-signature is generated based on the aggregate signature and contains an implicit length tag to verify that the number of signature generation requests is limited. The aggregate signature is generated if the height of the search tree does not exceed a predetermined height limitation.

6 Claims, 9 Drawing Sheets

SYSTEM AND METHOD FOR GENERATING KEYLESS DIGITAL MULTI-SIGNATURES

TECHNICAL FIELD

This invention relates generally to the creation of digital signatures. More particularly, the present invention relates to a system and method of generating keyless digital multi-signatures for digital data.

BACKGROUND AND SUMMARY OF THE INVENTION

Digital signatures are often used to authenticate digital data such as documents, messages, financial information, and other data. When a piece of data is digitally signed, a recipient of the data can verify that the data is from a particular sender, known as a signer, and that the data has not been altered since it was signed. A digital signature may also certify when data was created or when the data was sent. Existing digital signature schemes utilize public-key cryptography in which a signer uses a private key to create a digital signature, and a public key that is paired with the private key is used to verify the digital signature. The public key is bound to the identity of the signer using public key certificates that are issued by a trusted Certificate Authority in this public-key infrastructure scheme. A recipient uses the public key certificate to verify the digital signature.

However, there are drawbacks to these existing digital signature schemes. A signer can produce an unlimited number of digital signatures using the private key once it is issued. More importantly, if the private key is stolen, an unauthorized entity can appear as the signer to generate and distribute legitimate digital signatures. In such a case, the legitimate signer can attempt to revoke the private key, but it becomes difficult to determine if any forged signatures were created in the time between the loss of the private key and when the private key was revoked. It also becomes more complicated to verify whether previously created signatures are valid because the private key associated with those signatures has been revoked. Furthermore, existing digital signature schemes rely on the trustworthiness of the Certificate Authority because the creation of the private key is out of the control of the signer. If the Certificate Authority is compromised, the digital signatures that have been created based on the private keys the Certificate Authority has issued would come under suspicion. Accordingly, the signer must place unconditional trust in the Certificate Authority.

Other digital signature schemes attempt to reduce the risk of an unauthorized entity producing digital signatures if the private key is stolen by sharing the private key between the legitimate signer and a server. However, public-key cryptography is still involved in such server-supported digital signature schemes and the private key can still be compromised by an unauthorized entity. Still other digital signature schemes utilize a time-stamping service that attempts to mitigate risk in the time between the loss of a private key and when the private key is revoked. However, this type of scheme only supports public-key infrastructure and its associated risks detailed above. Also, because it may not be known when the private key was lost or stolen, forged signatures may still have been generated before the private key is revoked.

Furthermore, some existing digital signature schemes do not rely on public and/or private keys but utilize signature generation servers that are able to support a single signature request at a time from a client computer. In one scheme, a keyless digital signature service provider operates a top-level signature generation server that is in communication with lower level servers that may be operated by other entities, such as customers of the service provider. The service provider may want to charge the operators of the lower level servers for the signatures generated at the top-level signature generation server. The number of keyless signatures generated at one time may not be easily tracked or limited in this scheme. Checking the total length of a hash chain when verifying a generated signature could be performed to track the number of generated signatures, but would require all customers to have the same maximum limit on the number of generated signatures. The needs of different customers could not be accommodated in this scenario.

Another way to limit the number of signatures generated by the top-level generation server is to include a numerical tag at each step in the hash chain when verifying a generated signature. The limit on the number of generated signatures could be set differently for each customer so that not all customers must have the same maximum limit. When a signature is verified in this scheme, the numerical tags would be checked to ensure that they are in strongly increasing order, i.e., each numerical tag must be greater than the numerical tag from the previous step in the hash chain, in order to verify the signature successfully. However, the customer server may bypass checking the numerical tags in this method to avoid the limitation on the number of generated signatures, while the remainder of the signature would still verify successfully.

The present invention is provided to generate a keyless digital multi-signature based on receiving a plurality of signature generation requests from one or more client computers. By handling multiple signature requests simultaneously, the present invention allows for more efficient and quicker generation of keyless digital signatures. Moreover, the present invention allows limits on the number of signatures that can be generated at a time as a way to track and/or cap the signatures a client computer requests for billing or other purposes. In one embodiment of the present invention, a system and method for generating a keyless digital multi-signature is disclosed in which a plurality of signature generation requests is received at a service provider computer from a client computer. A search tree including a subtree from each of the client computers is constructed. The leaf nodes of the search tree correspond to each of the signature generation requests. The search tree is balanced by assigning explicit length tags to leaf nodes of the search tree as needed. A hash value is computed for each of the nodes in the search tree by applying a hash function to the nodes. The hash value of the root node of the search tree and a search tree height tag make up an aggregate signature request. The aggregate signature request causes an aggregate signature to be created and received at the service provider computer. The aggregate signature is only created if the search tree height tag does not exceed a height limitation. The keyless digital multi-signature for the signature generation requests is generated based on the aggregate signature. An implicit length tag that is empty in the aggregate signature is filled when the keyless digital multi-signature is generated and verified so that the number of signature generation requests is limited. Other features and advantages are provided by the following description and drawings.

DETAILED DESCRIPTION OF THE INVENTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
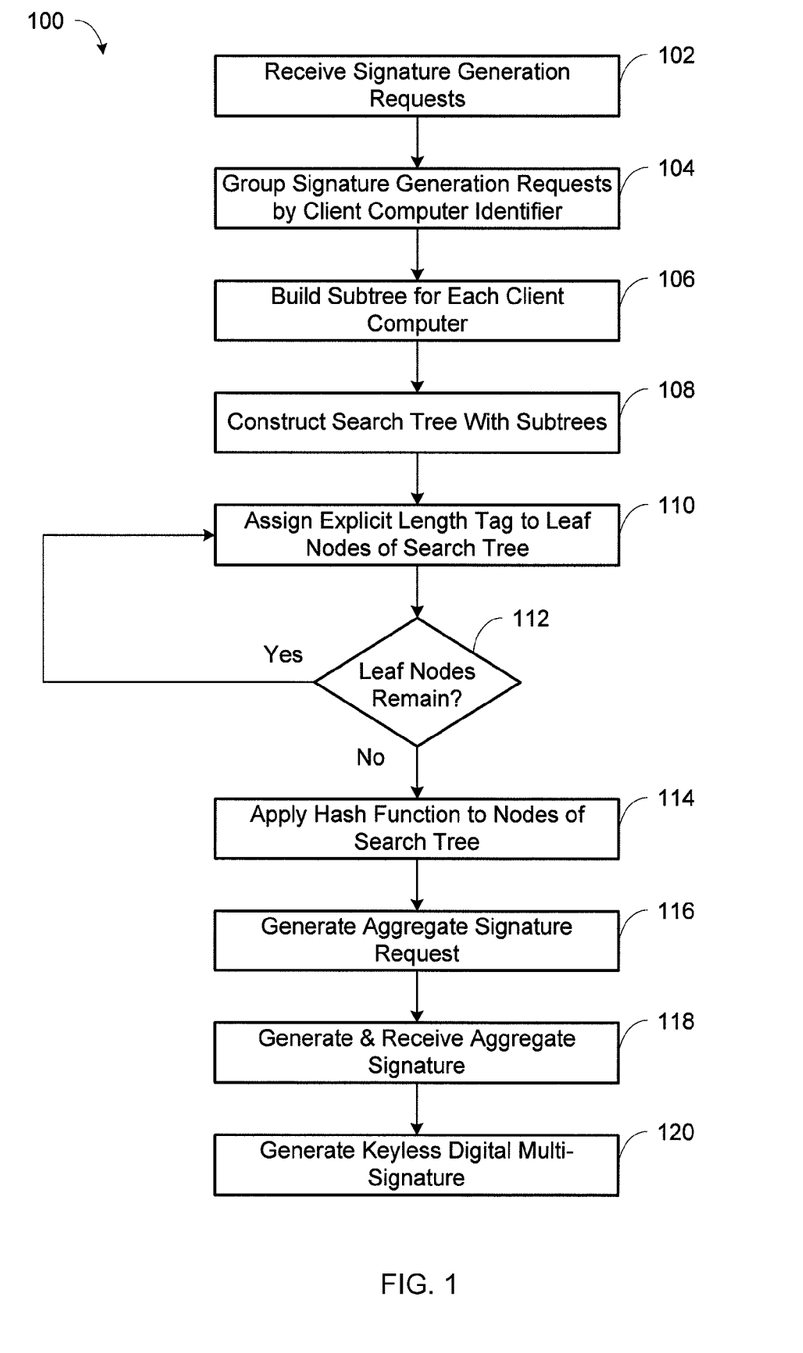
FIG. 1 is a general flowchart of the method for generating a keyless digital multi-signature.

FIG. 1 illustrates a preferred embodiment of a process 100 for generating a digital keyless multi-signature. The process 100 can result in the creation of a keyless digital multi-signature in response to multiple signature generation requests received from one or more client computers. The process 100 may be implemented on a single server or on multiple servers in electrical communication with each other. In one embodiment, the server(s) may be operated by a single service provider that creates the digital keyless multi-signatures for one or more client computers and/or other service providers. In another embodiment, a parent server may be operated by a service provider while child servers that are in communication with the parent server are operated by other entities. The child servers can transmit the signature generation requests to the parent server in this embodiment. The parent server can then generate and transmit the keyless digital multi-signature back to the child servers.

The server(s) may include a suitable processor, as are known to those of skill in the art. The processor is operably connected to at least one memory storage device, such as a hard-drive or flash-drive or other suitable memory storage device, that can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory storage device may incorporate electronic, magnetic, optical, and/or other types of storage media. The memory storage device can have a distributed architecture where various components are situated remote from one another, but are still accessed by the processor.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

When the server is in operation, the processor is configured to execute software stored within the memory storage device, to communicate data to and from the memory storage device, and to generally control operations of the server pursuant to the software. The software aspects of the present invention and the O/S, in whole or in part, but typically the latter, are read by processor, perhaps buffered within the processor, and then executed.

When the present invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication between servers and/or between a server and a client computer, the servers are equipped with network communication equipment and circuitry. In a preferred embodiment, the network communication equipment includes a network card such as an Ethernet card. In a preferred network environment, each of the server(s) is configured to use the TCP/IP protocol to communicate via the network 301. It will be understood, however, that a variety of network protocols could also be employed, such as IPX/SPX, Netware, PPP and others. Wireless network connections are also contemplated, such as wireless Ethernet, satellite, infrared and radio frequency networks.

Figure 5A:
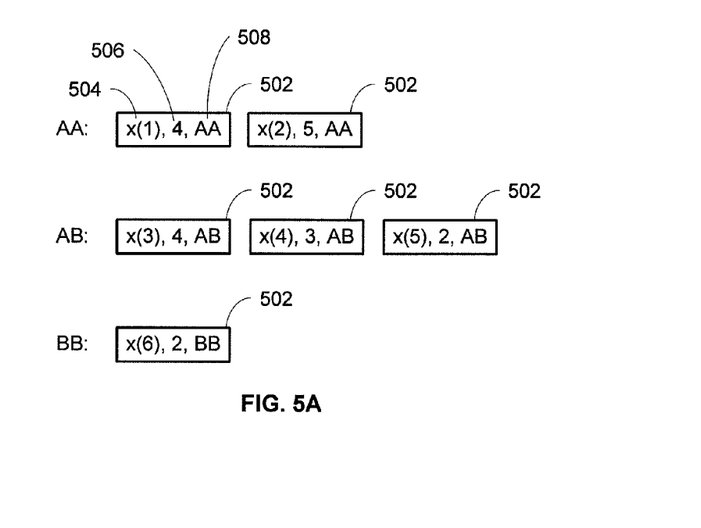
FIGS. 5A-5D illustrate signature generation requests and the resulting hash trees that are created in accordance with the present invention.

Referring back to FIG. 1, at step 102 of the process 100, a service provider computer can receive a plurality of signature generation requests 502 from one or more client computers. The signature generation requests 502 can each include data 504, a tree height tag 506, and a client computer identifier 508, as shown in FIG. 5A. For example, in FIG. 5A, the first signature generation request 502 has data 504 x(1), a tree height tag 506 of 4, and a client computer identifier 508 of "AA". The data 504 can represent any type of digital information that can be signed with a keyless digital multi-signature. The data 504 may include documents, e-mail, or any other type of digitally-represented information. The tree height tag 506 represents the height of a tree included in a signature generation request 502. The height of a tree in a signature generation request 502 is taken into account when creating a search tree 524 later in the process 100 so that the search tree 524 is properly balanced. A root hash value of the tree may be included in a signature generation request 502 to represent multiple signature generation requests related to the data 504. The client computer identifier 508 is a unique identification of the client computer that sent the signature generation request 502. The client computer identifiers 508 may be textual, numerical, alphanumerical, or other representation that identifies the client computer.

At step 104, the signature generation requests 502 can be grouped by their respective client computer identifiers 508. The signature generation requests 502 may be stored in a sorted database, in a preferred embodiment. There are three client computer identifiers 508 shown in the example of FIG. 5A: AA, AB, and BB. The signature generation requests 508 are shown grouped by the client computer identifiers 508 in lexicographic order. If other representations are used for the client computer identifiers 508, any order relation of the identifiers 508 may be used for grouping of the signature generation requests 502 into the sorted database.

Figure 5B:
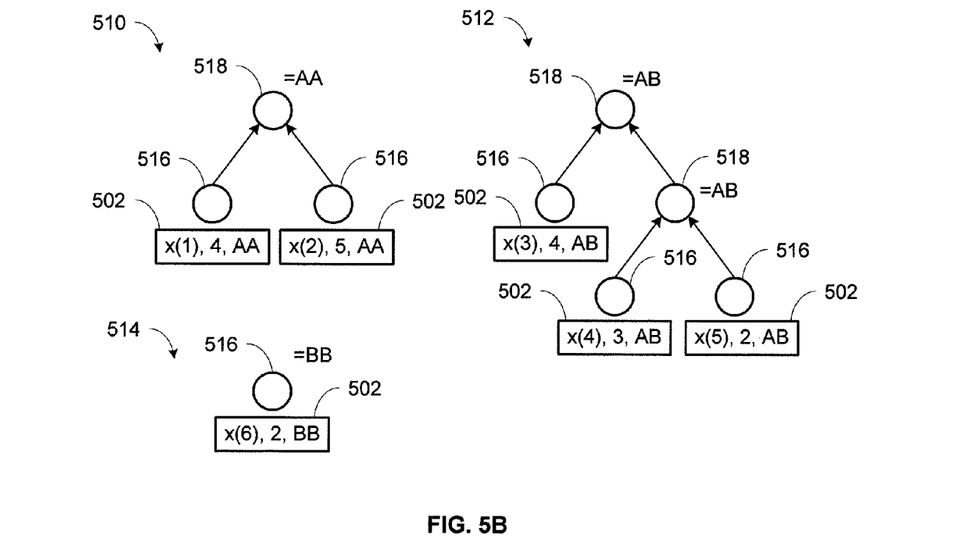

A subtree for each client computer can be built at step 106. The subtrees can be built based on the groupings of the signature generation requests 502 performed at step 104. In particular, the leaf nodes of each subtree can each be assigned a signature generation request 502. As seen in the example of FIG. 5B, there are three subtrees 510, 512, and 514 built for each of the client identifiers AA, AB, and BB, respectively. The leaf nodes 516 in the subtrees 510, 512, and 514 have the signature generation requests 508 assigned to them. In the case of the subtrees 510 and 512 for client identifiers AA and AB, there are additional nodes 518 that will be intermediate nodes of the search tree 524 to be composed later in the process 100.

Figure 5C:
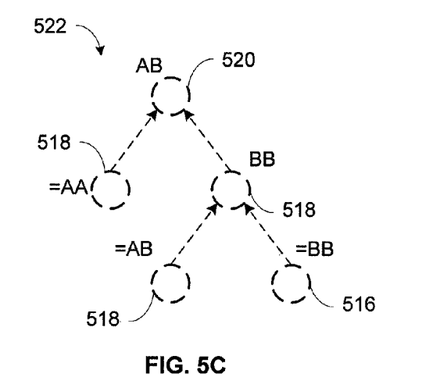
Figure 5D:
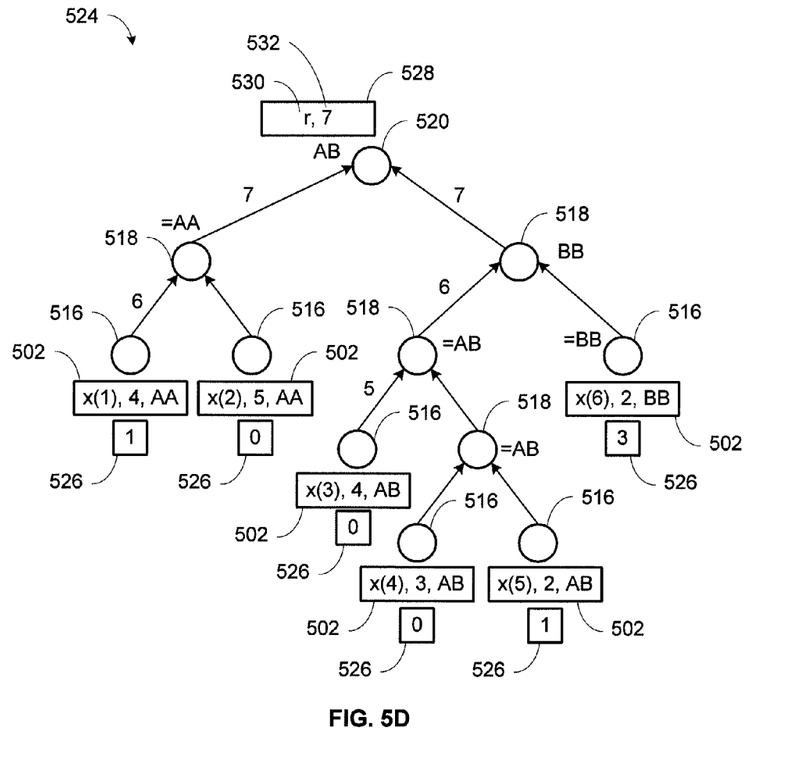

A search tree skeleton 522 can be created and the subtrees can be assigned to the search tree skeleton 522 to create a search tree 524 at step 108, as in the example shown in FIGS. 5C and 5D. The search tree skeleton 522 in FIG. 5C includes the intermediate nodes 518 from the subtrees 510, 512, and 514, as well as the leaf node "=BB" 516. The leaf node "=BB" 516 is included in the search tree skeleton 522 because it was the subtree 514 for the client computer identifier BB created at step 106. The search tree skeleton 522 is used to connect the subtrees 510, 512, and 514, based primarily on the lexicographical characteristics of the client computer identifiers 508 in the leaf nodes 516 of the search tree 524. The search tree 524 shown in the example of FIG. 5D is constructed based on the subtrees 510, 512, and 514 as well as the search tree skeleton 522. The search tree 524 includes leaf nodes 516, intermediate nodes 518, and a root node 520. Generation of an aggregate signature request 528 will result by applying a hash function to each node of the search tree 524, as detailed further below. The notations "=AA", "=AB", and "=BB" related to the intermediate nodes 518 in the search tree 524 of FIG. 5D refers to search keys assigned to the intermediate nodes 518. The child and grandchild nodes of each of the intermediate nodes 518 have the same client identifier (e.g., AA, AB, or BB) as the respective intermediate node. For example, the intermediate node 518 with the search key "=AA" has two child nodes, each of which have the client identifier AA.

At step 110, an explicit length tag 526 can be assigned to each leaf node 516 to balance the constructed search tree 524. The process 100 iterates through steps 110 and 112 until all leaf nodes have been assigned an explicit length tag 526. The explicit length tag 526 may be zero or non-zero. The search tree 524 may be unbalanced due to the tree height tags 506 in the signature generation requests 502 and/or due to the length of the individual hash chains contained within the search tree 524. The tree height tags 506 contribute to the height of the search tree 524 due to the trees contained within each of the signature generation requests 502.

As seen in the example shown in FIG. 5D, the tallest heights are due to the signature generation requests 502 x(3) and x(4). In particular, the request 502 x(3) has a tree height tag 506 of 4 and the request 502 x(4) has a tree height tag 506 of 3, but the request 502 x(4) is one level lower than the request 502 x(3) in the search tree 524. Due to these tree height tags 506, the height of the search tree 524, before assigning any explicit length tags 526, is 7. However, to properly balance the search tree 524, explicit length tags 526 are assigned to the leaf nodes 516 as necessary. In the example shown in FIG. 5D, non-zero explicit length tags 526 need to be assigned to the requests 502 x(1), x(5), and x(6) so that the height from those respective leaf nodes 516 to the root node 520 is 7. In other words, at steps 110 and 112, the assignment of the explicit length node tags 526 takes into account the level where a leaf node 516 is in the search tree 524, as well as the tree height tags 506 in the signature generation requests 502.

Figure 2:
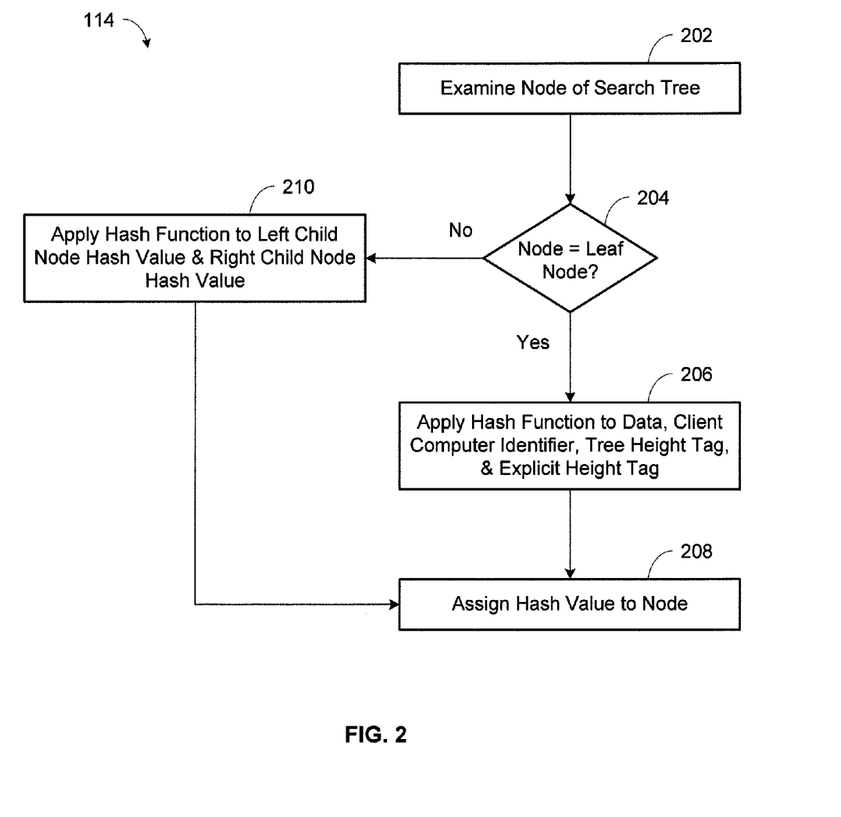
FIG. 2 is a flowchart illustrating the application of a hash function to nodes of a search tree in the generation operation of FIG. 1.
Figure 6A:
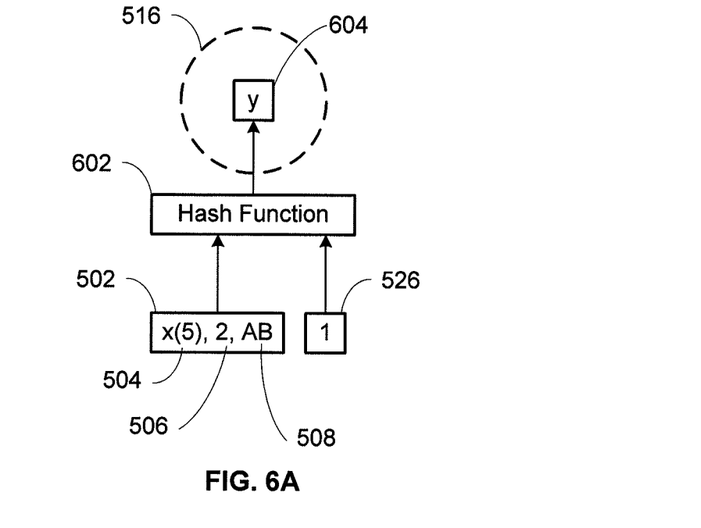
FIGS. 6A-6B illustrate the application of hash functions to nodes of a hash tree in accordance with the present invention.
Figure 6B:
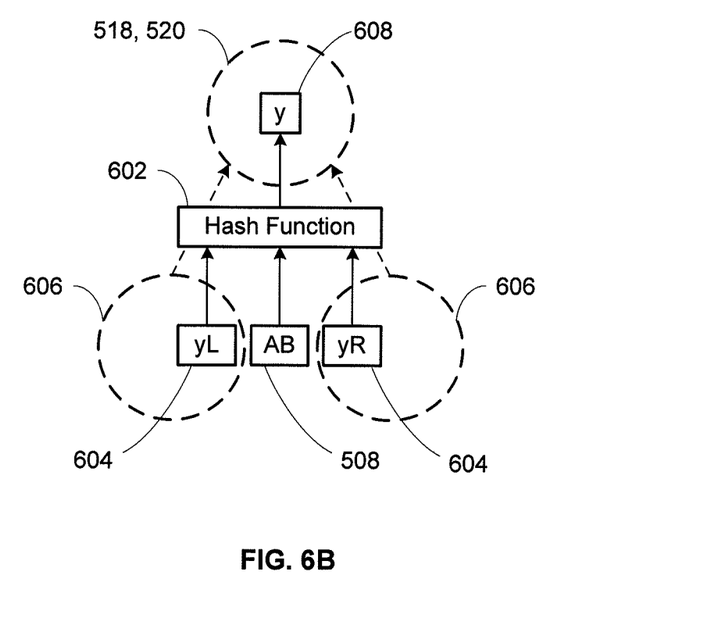

Hash values for all nodes of the search tree 524 can be computed at step. 114, which is further detailed with regards to FIG. 2. At step 202, a particular node of the search tree 524 can be examined. Depending on whether the node is a leaf node 516 or a non-leaf node (either an intermediate node 518 or the root node 520) at step 204, the process 114 continues to step 206 or step 210, respectively. If the node is a leaf node 516, at step 206, a hash function 602 can be applied to the leaf node 516 based on the data 504, tree height tag 506, client computer identifier 508, and explicit length tag 526. An example is shown in FIG. 6A for the signature generation request 502 x(5). The resulting hash value 604 y can be assigned to the particular leaf node 516 at step 208. However, if the node being examined is a non-leaf node 518, 520 at step 204, then the hash function 602 can be applied to the client computer identifier 508 and to the hash values of the left child node and right child node 606 connected to the non-leaf node 518, 520. An example is shown in FIG. 6B. The non-leaf node may include an intermediate node 518 or the root node 520. The resulting hash value 608 y can be assigned to the non-leaf node 518, 520 at step 208. The hash function 602 may include SHA-1, SHA2-224, SHA2-256, SHA2-384, SHA2-512, RIPEMD-160, and other cryptographic hash functions.

Ultimately, the root hash value 530 r for the root node 520 of the search tree 524 can be computed once all the other nodes in the search tree have had their hash value computed. The root hash value 530 r represents and includes the hash values of all the other nodes in the search tree 524. At step 116, the aggregate signature request 528 can be computed and includes the root hash value 530 r and a search tree height tag 532. In the example shown in FIG. 5D, the search tree height tag 532 is 7, which is the height of the search tree 524, including the tree height tags 506 in the signature generation requests 502 and the explicit length tags 526.

The aggregate signature request 528 may be processed at the service provider computer or may be transmitted to a parent server in communication with the service provider computer. At step 118 of the process 100, the aggregate signature 700 can be generated and received, based on the aggregate signature request 528, as further detailed with regards to FIG. 3. At step 302 of the process 118, the aggregate signature request 528 may be received, either locally on the same computer or at a parent server, as discussed previously. The search tree height tag 532 can be examined at step 304 to determine whether it exceeds a predetermined height limit. The height limit may be assigned to place a cap on the number of signatures that a client computer may request to be generated or to limit the number of signatures that can be processed for efficiency, pre-existing workload, or other reasons. The height limit may also be assigned by the parent server to the service provider computer to control the amount of service that can be sold by the service provider computer, e.g., the number of signatures that can be generated by the service provider computer. This scenario may occur when the service provider computer is a reseller of the signature generation service that is provided by the parent server.

Figure 3:
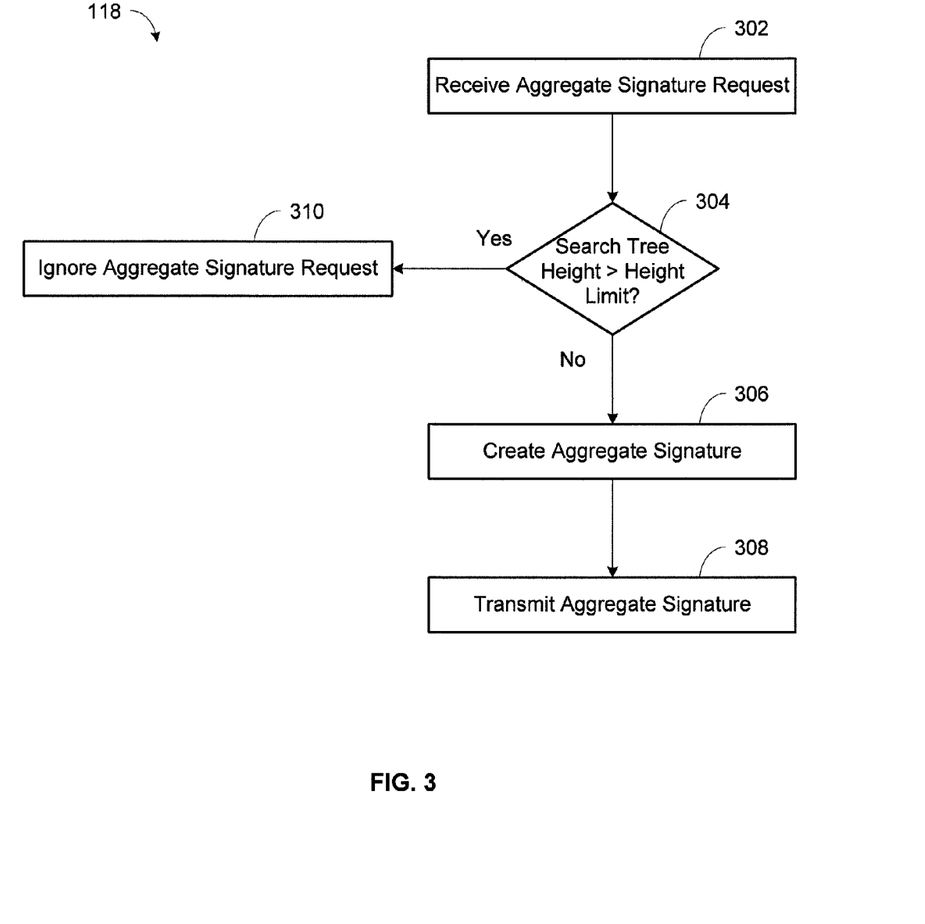
FIG. 3 is a flowchart illustrating the generation of an aggregate signature in the generation operation of FIG. 1.

If the search tree height tag 532 exceeds the predetermined height limit at step 304, then the aggregate signature request 530 can be ignored and dropped at step 310. In this case, the aggregate signature 700 and the keyless digital multi-signature 800 will not be generated. However, if the search tree height tag 532 is less than or equal to the predetermined height limit at step 304, then the aggregate signature 700 can be created at step 306. The search tree height tag 532 may also be included in the search tree 524 at step 306. The aggregate signature 700 is transmitted at step 308, either within the service provider computer, or from the parent server to the service provider computer, depending on which computer processed the aggregate signature request 530.

In some embodiments, the aggregate signature 700 may have the same hash tree structure as the search tree 524. However, a hash function has been applied to the hash values of the nodes of the search tree 524, including the root hash value 530 r and search tree height tag 532, to generate the aggregate signature 700. The aggregate signature 700 may also include shorter hash chains than the hash chains that will be present in the keyless digital multi-signature 800. The hash function used to create the aggregate signature 700 may be the same or a different deterministic function than the hash function used to create the hash values in the search tree 524. A timestamp can also be hashed into the aggregate signature 700 to indicate the date and time when the aggregate signature 700 was generated. The aggregate signature 700 can be digitally signed in response to receiving the aggregate signature request 530. The digital signature applied to the aggregate signature request 528 may be based on a public key encryption scheme, a public/private key encryption scheme, or any other scheme that authenticates the identity of the issuer of the signature. A unique serial number may be included in the aggregate signature 700. An implicit length tag 732 may further be included in the aggregate signature 700 and may initially be left blank when the aggregate signature 700 is generated. The implicit length tag 732 can be filled when counting the number of hash computational steps when the keyless digital multi-signature 800 is generated and/or verified. The value of the filled-in implicit length tag 732 can be compared to the search tree height tag 532 to ensure that the number of signature generations requests that were transmitted by the client computer is within limitations. In other embodiments, the aggregate signature 700 may include a published hash value with timestamp and location information about when and where the hash value was published. The timestamp and location information may be hashed into the published hash value, for example. The published hash value may be added to the keyless digital multi-signature 800 as an additional data structure to allow for easy extractability from the keyless digital multi-signature 800.

If a client computer tries to transmit a signature generation request 502 that has a tree height tag 506 that is smaller than the actual height of the tree in the signature generation request 502, the use of an implicit length tag 732 that must be filled in helps ensure that the signature generation limitations on a client computer are followed. For example, if the client computer attempts to add an external data structure to the tree with a false height, this would be evidence that there was an intentional abuse of the signature generation service.

Figure 4:
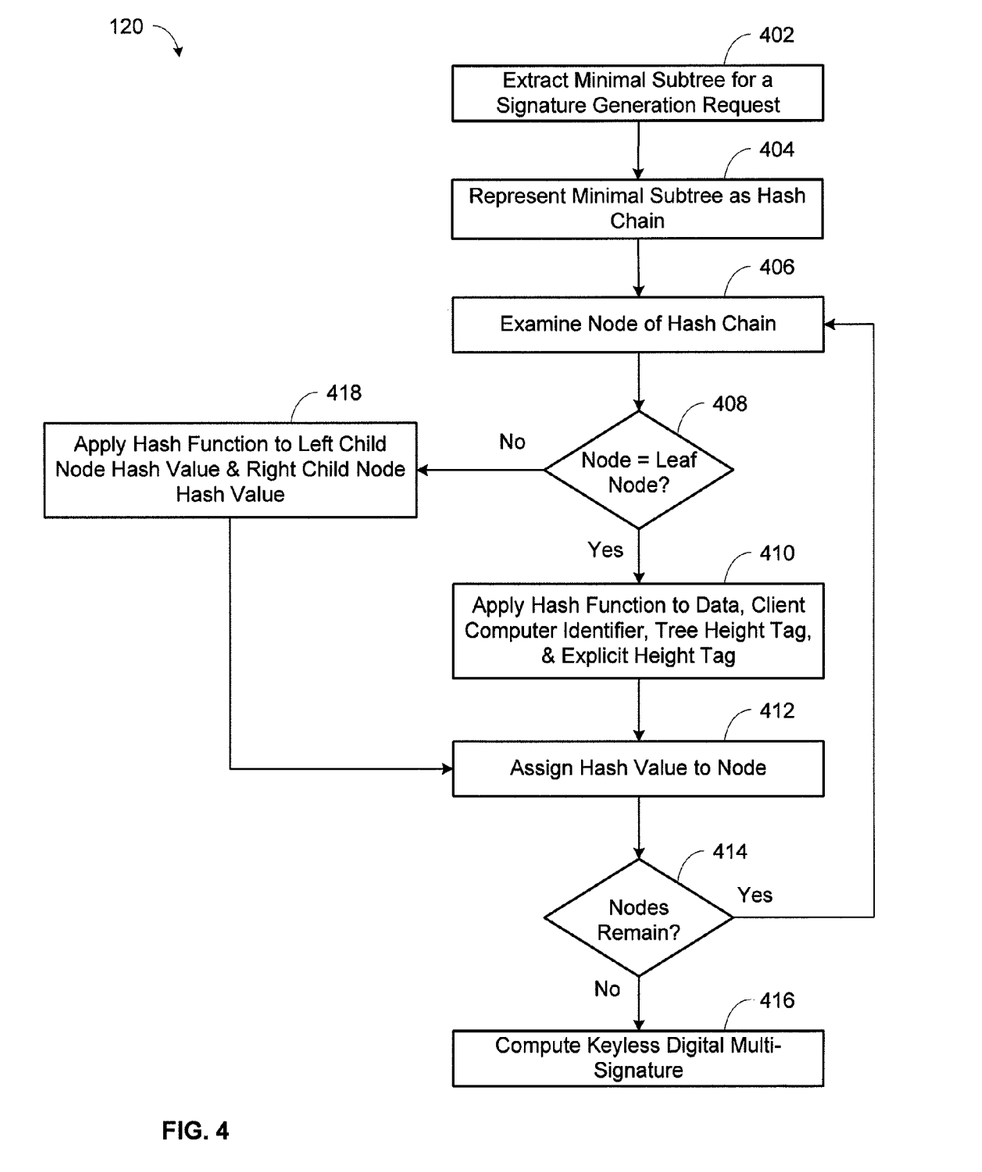
FIG. 4 is a flowchart illustrating the generation of a keyless digital multi-signature following reception of an aggregate signature in the generation operation of FIG. 1.
Figure 7A:
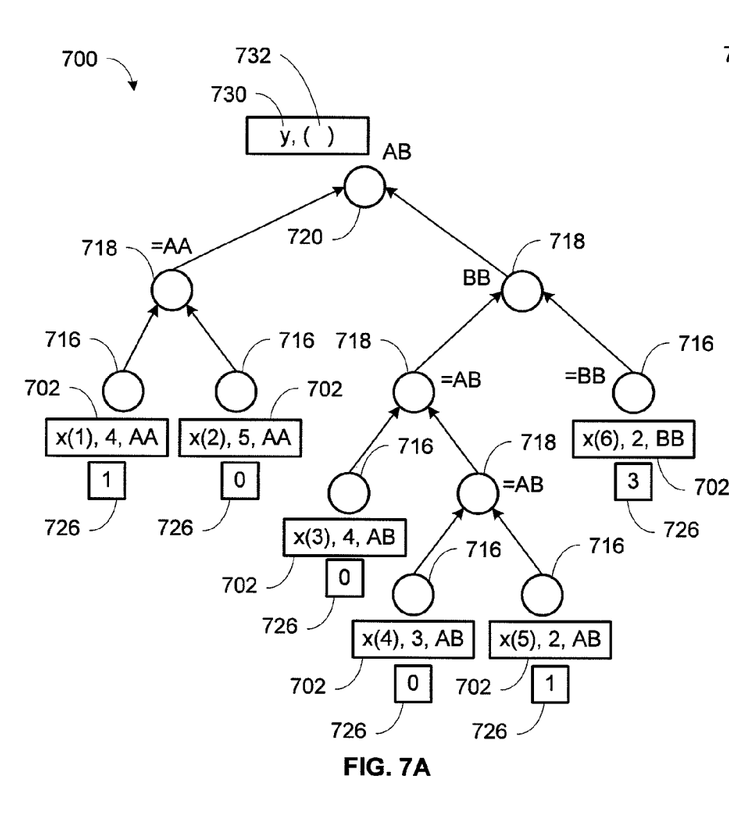
FIGS. 7A-7B illustrate hash trees associated with the generation of the keyless digital multi-signature in accordance with the present invention.

Generation of the keyless digital multi-signature 800 is performed at step 120, and is detailed further with regards to FIG. 4. At step 402 of the process 120 shown in FIG. 4, a minimal subtree 752 for a signature generation request 502 can be extracted from the aggregate signature 700. The minimal subtree 752 may be extracted based on the tree in the aggregate signature 700 and a particular leaf node of the tree corresponding to a particular signature generation request 502. The aggregate signature 700 shown in FIGS. 7A and 7B includes leaf nodes 716, intermediate nodes 718, and a root node 720. The signature generation requests 702 and the explicit length tags 726 are assigned and hashed into the leaf nodes 716. As described previously, although the aggregate signature 700 may have the same hash tree structure as the search tree 524, the hash values of the nodes of the aggregate signature 700 differ from those of the search tree 524, due to the application of a hash function, addition of a timestamp, and the digital signing of the aggregate signature 700.

Figure 7B:
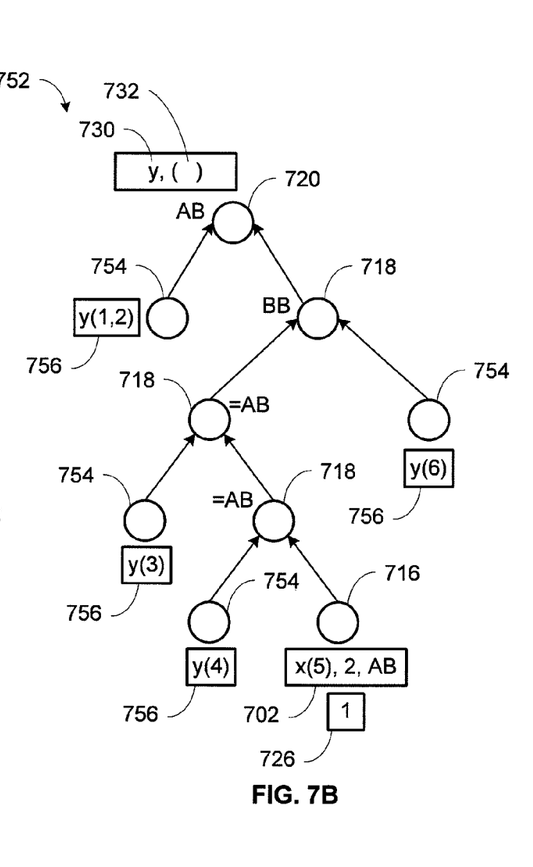

In the example shown in FIG. 7B, the minimal subtree 752 for the signature generation request 702 x(5) for the client computer identifier AB is shown. The minimal subtree 752 includes the nodes that are in the direct path from the root node 720 to the particular leaf node 716 corresponding to the signature generation request 702 x(5). In particular, the minimal subtree 752 shown in FIG. 7B includes the intermediate nodes 718 "AB", "BB", "=AB", and "=AB". These nodes are also known as search key nodes in the context of the minimal subtree 752. The minimal subtree 752 also includes the hash values 756 of the sibling nodes 754 connected to the search key nodes 718. The sibling hash chain values 756 include hash values for the sibling nodes 754 that are not in the direct path from the root node 720 to the leaf node 716, but are part of the aggregate signature 700. The sibling hash chain values 756 are needed to calculate the root hash value 730 y. The minimal subtree 752 can be represented as a hash chain 850, such as in the keyless digital multi-signature 800 shown in FIG. 8, at step 404. The keyless digital multi-signature 800 includes the root hash value 730 y, the implicit length tag 732, and the hash chain 850. The root hash value 530 r of the search tree 524 is equal to the root hash value 730 y.

At step 406, a node of the hash chain 850 can be examined, and it can be determined at step 408 whether the examined node corresponds to a leaf node 716. If the node corresponds to a leaf node 716, then at step 410, a hash function 802 is applied to the data 704, tree height tag 706, client computer identifier 708, and explicit length tag 726 in the signature generation request 702. The resulting hash value is assigned to the node at step 412. If the node does not correspond to a leaf node at step 408, then at step 418, the hash function 802 is applied to the search key identifiers 804 ("=AB", "BB", and "AB") of the search key nodes 718 and the hash values of the left child node and right child node connected to the non-leaf node, followed by assigning the resulting hash value to the non-leaf node at step 412. If additional nodes remain in the hash chain 850 at step 414, then the process 120 returns to step 406 to compute the hash values for the remaining nodes. The hash function 802 may be the same or a different deterministic function than the hash function used to create the hash values in the search tree 524 and/or the aggregate signature 700. If no nodes remain in the hash chain 850 at step 414, then the keyless digital multi-signature 800 is computed at step 416. The final node that is processed is the root node 720, and the resulting root node hash value 730 y, the implicit length tag 732, and the hash chain 850 comprise the keyless digital multi-signature 800. The implicit length tag 732 can be calculated by counting the number of steps in the hash chain 850.

Figure 8:
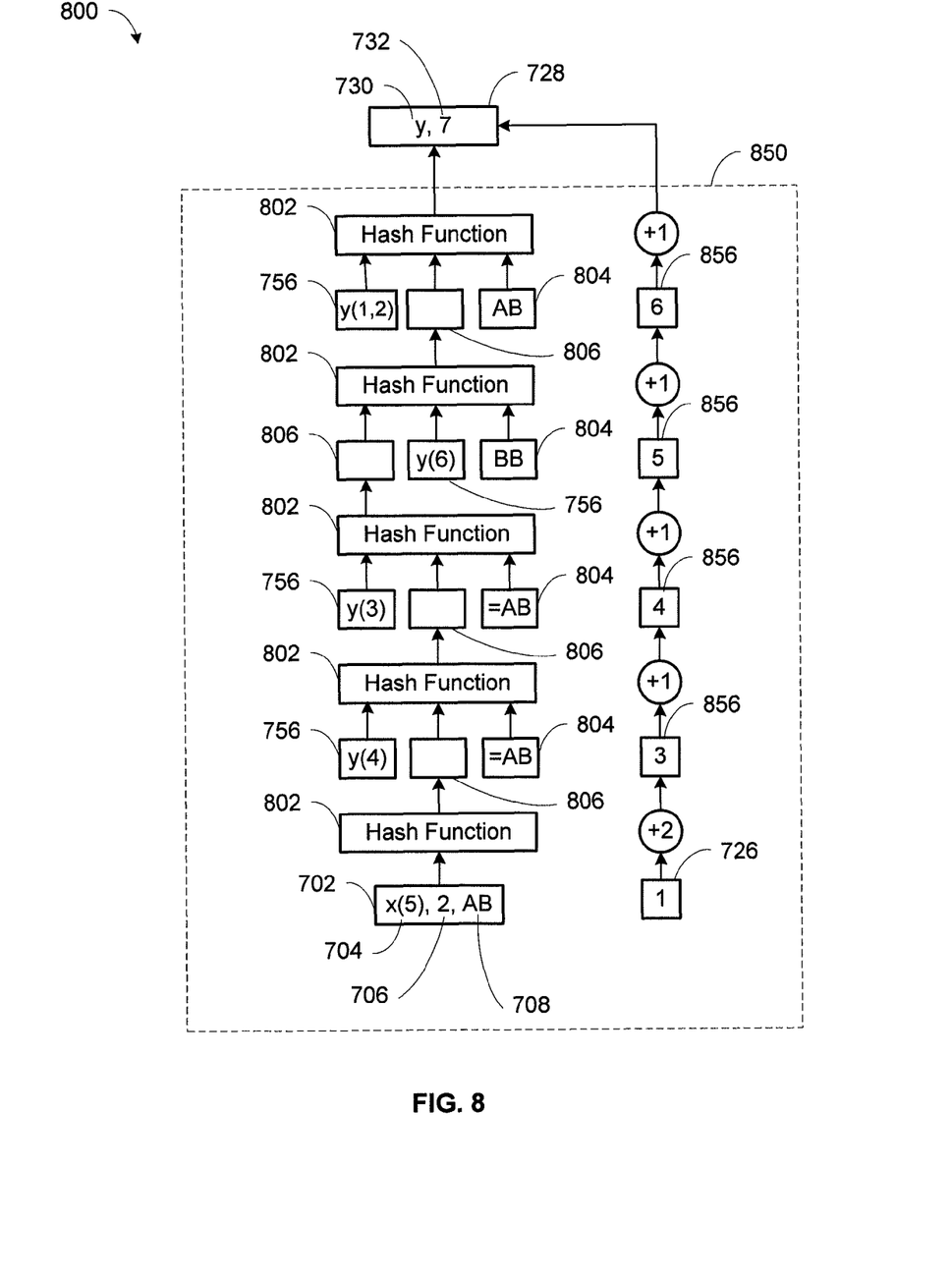
FIG. 8 illustrates a hash chain and keyless digital multi-signature related to the generation of the keyless digital multi-signature in accordance with the present invention.

In the example shown in FIG. 8, the entire hash chain 850 is depicted starting from the signature generation request 702 x(5) at the bottom of FIG. 8 to the root hash value 730 at the top of FIG. 8. At each computation step in the hash chain 850, the hash function 802 is applied, beginning with the information in the signature generation request 702 x(5). In each successive computation step, the sibling hash values 756, the search key identifiers 804, and the hash value result 806 from the previous hash function step are hashed with the hash function 802 until the root hash value 730 is calculated. Regarding the implicit length tag 732 of the hash chain 850, at each computation step, the height of the tree is computed starting with the explicit length tag 726 of 1 in the signature generation request 702. In the first computation step, the tree height tag 706 of 2 in the signature generation request 702 is added to produce an intermediate height 856 of 3. For each successive computation step in the example shown in FIG. 8, an additional height of 1 is added to produce successive intermediate heights 856. The additional height added could be another value, depending on whether the particular nodes involved have a non-zero explicit length tag 726. When the root node is reached, the total number of steps in the hash chain 850 is placed into the implicit length tag 732. In the example of FIG. 8, the implicit length tag is calculated as 7. In this way, the keyless digital multi-signature 800 is generated for one of the signature generation requests 702, and contains the root hash value 730, the filled-in implicit length tag 732, and the hash chain 850.

In some embodiments, the hash chain computation is performed during a verification of the keyless digital signature 800. At each computation step in the hash chain 850 shown in FIG. 8, the client computer identifier 708 may be compared to the search key identifiers 804 when the hash function is applied, in order to ensure that the signature generation request 702 is in the correct position in the hash tree of the aggregate signature 700 from which the minimal subtree 752 is extracted. In other words, the order of the computational steps in the hash chain 850 is checked to make sure it is consistent with the ordering of the signature generation requests 702 in the sorted database. As discussed above, the signature generation requests 702 may be grouped in lexicographic order of the client computer identifiers 708 or by other order relation. In the example of FIG. 8, the search key identifiers 804 "=AB" and "AB" are compared to the client computer identifier 708 "AB" to check that they are the same. The search key identifier 804 "BB" is compared to check whether it is "greater" than the client computer identifier 708 "AB". In this example, "BB" is "greater" than "AB" based on their lexicographic order. This can also be seen in the hash tree of the aggregate signature 700, where the signature generation request 702 with the client computer identifier "BB" is to the right of the signature generation requests 702 with the client computer identifiers "AB".

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:
1. A method for digitally signing data, comprising:
receiving a plurality of signature generation requests from at least one client computer, wherein each of the plurality of signature generation requests corresponds to a lowest level node of a hash tree structure and comprises a hash computation of at least a data entry and a first tree height tag,
said data entry corresponding to a hash computation of a hash sub-tree subordinate to the respective lowest level node, said sub-tree having a number, zero or greater, of hash sub-tree computational levels;
determining each first tree height tag as a count of the number of hash sub-tree computational levels represented in the lowest level node representing the respective signature generation request;
constructing a hash tree having the plurality of signature generation requests as the lowest-level nodes, a plurality of intermediate nodes comprising successively higher order hash functions of immediately lower level nodes, and a root node corresponding to an aggregate signature request;
computing the aggregate signature request as a root hash value as a highest level hash function of highest level intermediate nodes, which in turn correspond to respective computations of hash values of relatively lower level nodes of the hash tree, such that the root hash value and thus the aggregate signature request encodes a hash of all of the signature generation requests;
determining an aggregate tree height as a maximum number of hash computational levels from a lowest hash sub-tree computational level to the root node, said maximum number being a function of the sum of at least one of the tree height tags and the number of hash computational levels from the respective lowest level node to the root node;
for each lowest level node, computing an implicit tree height tag such that the sum of the corresponding lowest level node's first tree height tag, implicit tree height tag, and the number of hash computational levels from the lowest level node to the root node equals the aggregate tree height tag; and associating the implicit tree height tag with the corresponding lowest level node;
computing a multi-signature as a function of the root hash value;
for each signature generation request:
computing a signature request length value as the sum of the respective tree height tag, the associated implicit tree height tag, and the number of hash computational levels from the corresponding lowest level node to the root; and if the signature request length value does not exceed a height limit, returning to the client computer(s) the multi-signature in response to the signature generation request.

2. A method as in claim 1, further comprising including a respective client computer identifier in each signature generation request.

3. The method of claim 2, further comprising grouping the plurality of signature generation requests into a grouped request in a sorted database based on the client computer identifier in each of the plurality of signature generation requests, wherein the grouped request has a common client computer identifier.

4. A method as in claim 1, further comprising generating a published aggregate value as a hash of both the root node and the height limit.

5. A method as in claim 4, further comprising time-stamping the published aggregate value.

6. A method as in claim 1, further comprising returning hash chain values as a data signature for each lowest-level node;

said hash chain comprising sibling hash values in a computation path from the respective lowest-level node to the root node;

whereby the data signature may be verified by successive recomputation of hash functions upward from a representation of the signature generation request from the corresponding lowest-level node to the root node.

* * * * *